(12) United States Patent
Wang et al.

(10) Patent No.: US 11,048,149 B2
(45) Date of Patent: Jun. 29, 2021

(54) LENS STRUCTURE AND PROJECTION APPARATUS

(71) Applicant: Coretronic Corporation, Hsin-Chu (TW)

(72) Inventors: Yun-Sheng Wang, HsinChu (TW); I-Hsien Liu, Hsin-Chu (TW); Ching-Feng Hsieh, Hsin-Chu (TW); Chien-Ming Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/936,395

(22) Filed: Jul. 22, 2020

(65) Prior Publication Data

US 2021/0026226 A1   Jan. 28, 2021

(30) Foreign Application Priority Data

Jul. 26, 2019 (CN) .......................... 201910682018.7

(51) Int. Cl.
*G03B 21/14* (2006.01)
*G03B 17/12* (2021.01)
*G03B 17/54* (2021.01)

(52) U.S. Cl.
CPC ............. *G03B 17/12* (2013.01); *G03B 17/54* (2013.01); *G03B 21/145* (2013.01)

(58) Field of Classification Search
CPC .... G03B 21/008; G03B 21/28; G03B 21/145; G03B 21/2013; G03B 21/2033; G03B 17/02; G03B 17/04; G03B 17/12; G03B 17/54; H04N 9/3105; H04N 9/3141; H04N 9/3152; H04N 9/3161; H04N 9/3164

See application file for complete search history.

(56) References Cited

U.S. PATENT DOCUMENTS

2013/0016961 A1* 1/2013 Fukai ................. G03B 17/04
                                                          396/72

FOREIGN PATENT DOCUMENTS

CN          208239743          12/2018

* cited by examiner

*Primary Examiner* — Sultan Chowdhury
(74) *Attorney, Agent, or Firm* — JCIPRNET

(57) ABSTRACT

A lens structure includes a lens barrel, a frame, a first lens module, a second lens module, and an elastic sleeve. The frame leans against a rear end of the lens barrel. A first gap is provided between the lens barrel and the frame. The first lens module includes a first side exposed outside the lens barrel and a second side arranged in a front end of the lens barrel. A second gap is provided between the lens barrel and the first lens module. The second lens module includes a third side arranged in the rear end of the lens barrel and a fourth side exposed outside the frame. The elastic sleeve sleeved on the lens barrel includes a first end extending to the frame to completely cover the first gap and a second end extending to a portion of the first lens module to completely cover the second gap.

20 Claims, 9 Drawing Sheets

LENS STRUCTURE AND PROJECTION APPARATUS

CROSS-REFERENCE TO RELATED APPLICATION

This application claims the priority benefit of China application serial no. 201910682018.7, filed on Jul. 26, 2019. The entirety of the above-mentioned patent application is hereby incorporated by reference herein and made a part of this specification.

BACKGROUND OF THE INVENTION

1. Field of the Invention

The invention relates to an optical structure and an optical device, in particular to a lens structure and a projection apparatus using the lens structure.

2. Description of Related Art

A pre-group lens group and a post-group lens group of a projection apparatus are assembled in a lens barrel, so that it is inevitable and unavoidable to produce assembling gaps between the lens barrel and the lens groups. If the projection apparatus is arranged in a smoking place or a place where exhaust gas is produced, smog will generate air convection with a heat dissipation flow field in the projection apparatus, and will flow into a gap of a lens of an optical machine and then flow into an optical machine body. Since accompanying impurities in the smog may be deposited and attached on the surface of an optical element in the optical machine, the brightness of the optical machine may be severely reduced.

In order to solve the above problem, Teflon sheets may be added at the gaps between the lens barrel and the pre-group and post-group lens groups as blockages, so as to achieve an effect of isolating the smog. However, Teflon is expensive, difficult to assemble, and not easily flattened in the lens barrel. Furthermore, if the projection apparatus needs to be repaired, the Teflon sheets after the repairing may only be scrapped and cannot be reused, which will increase the manufacturing cost. If grease is applied to the gaps as the blockages, the grease will be pushed away after the lens barrel is rotated for a plurality of times, and the position of the grease cannot be fixed, so that the smoke prevention effect cannot be kept consistent. Therefore, how to prevent the smog from entering the optical machine through air convection to reduce the reduction of projection brightness has become an important issue in the development of a projection device technology.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention is directed to a lens structure, which can greatly reduce and even avoid smog from entering the lens structure via air convection.

The invention is further directed to a protection apparatus, including the aforementioned lens structure and having relatively good brightness performance.

Other objectives and advantages of the invention may be further understood from the technical features disclosed in the invention.

In order to achieve one or part or all of the aforementioned objectives or other objectives, one embodiment of the invention provides a lens structure, including a lens barrel, a frame, a first lens module, a second lens module and an elastic sleeve. The lens barrel includes a front end and a rear end opposite thereto. The frame leans against the rear end of the lens barrel, and a first gap is provided between the lens barrel and the frame. The first lens module includes a first side and a second side opposite thereto. The second side is arranged in the front end of the lens barrel, and the first side is exposed outside the lens barrel. A second gap is provided between the lens barrel and the first lens module. The second lens module includes a third side and a fourth side opposite thereto. The third side passes through the frame and is arranged in the rear end of the lens barrel, and the fourth side is exposed outside the frame. The elastic sleeve includes a first end and a second end opposite thereto, and the elastic sleeve is sleeved on the lens barrel. The first end extends and is connected to the frame to completely cover the first gap, and the second end extends onto a portion of the first lens module to completely cover the second gap.

In order to achieve one or part or all of the aforementioned objectives or other objectives, one embodiment of the invention provides a projection apparatus, including a lens structure and an optical machine module. The lens structure includes a lens barrel, a frame, a first lens module, a second lens module and an elastic sleeve. The lens barrel includes a front end and a rear end opposite thereto. The frame leans against the rear end of the lens barrel, and a first gap is provided between the lens barrel and the frame. The first lens module includes a first side and a second side opposite thereto. The second side is arranged in the front end of the lens barrel, and the first side is exposed outside the lens barrel. A second gap is provided between the lens barrel and the first lens module. The second lens module includes a third side and a fourth side opposite thereto. The third side passes through the frame and is arranged in the rear end of the lens barrel, and the fourth side is exposed outside the frame. The elastic sleeve includes a first end and a second end opposite thereto, and the elastic sleeve is sleeved on the lens barrel. The first end extends and is connected to the frame to completely cover the first gap, and the second end extends onto a portion of the first lens module to completely cover the second gap. The optical machine module is assembled on the frame of the lens structure. The frame is located between the lens barrel and the optical machine module, and the fourth side of the second lens module is located in the optical machine module.

Based on the above, the embodiments of the invention at least have one of the following advantages or efficiencies. In the lens structure of the invention, the elastic sleeve is sleeved on the lens barrel; the first end of the elastic sleeve extends and is connected to the frame to completely cover the first gap between the lens barrel and the frame, and the second end of the elastic sleeve extends onto the portion of the first lens module to completely cover the second gap between the lens barrel and the first lens module. Thereby, the elastic sleeve can substantially reduce and even prevent smog from entering the lens structure from the first gap and the second gap via air convection. In addition, the projection apparatus using the lens structure of the invention can avoid the problem of great brightness reduction caused by the influence of the smog, and thus has relatively good brightness performance.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
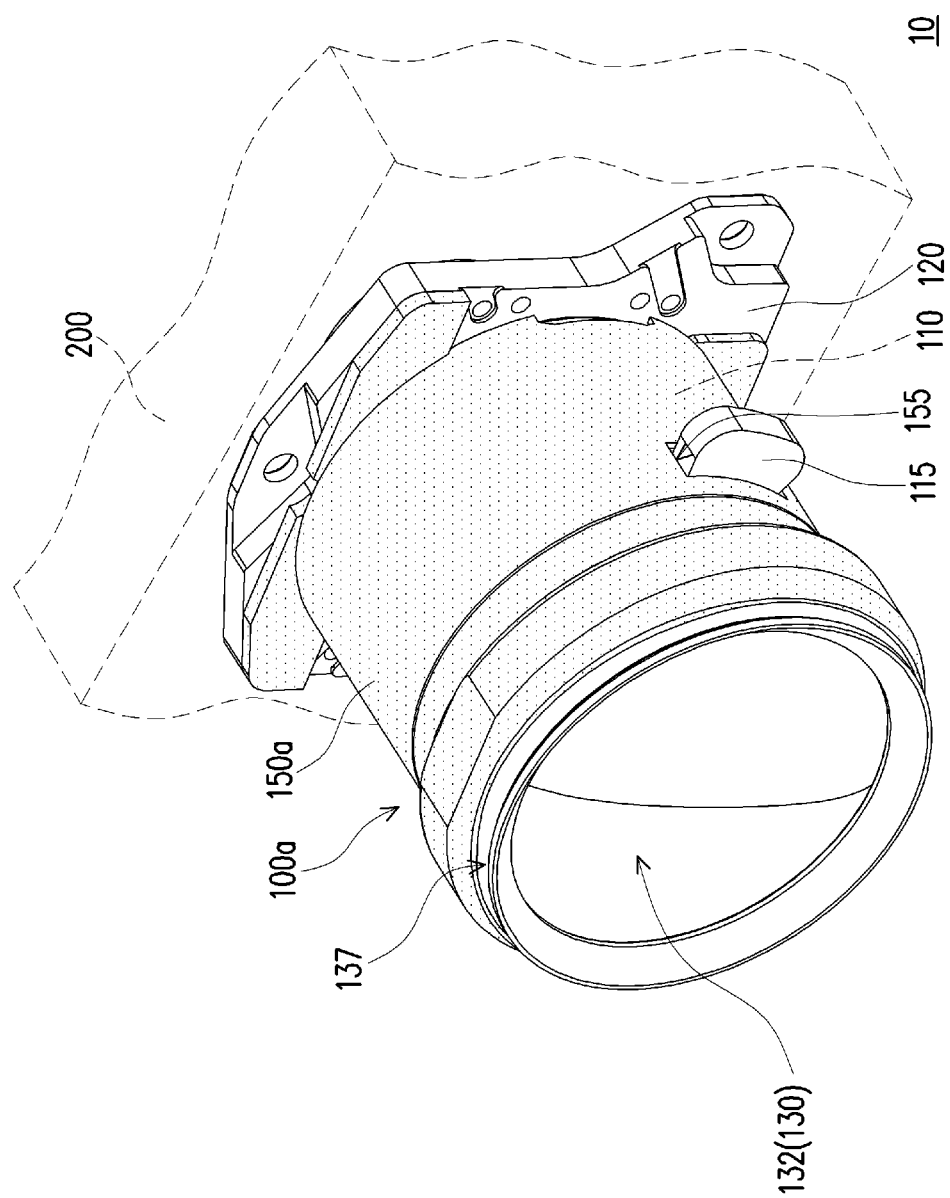
FIG. 1A is a three-dimensional diagram of a projection apparatus portion of one embodiment of the invention.
Figure 1B:
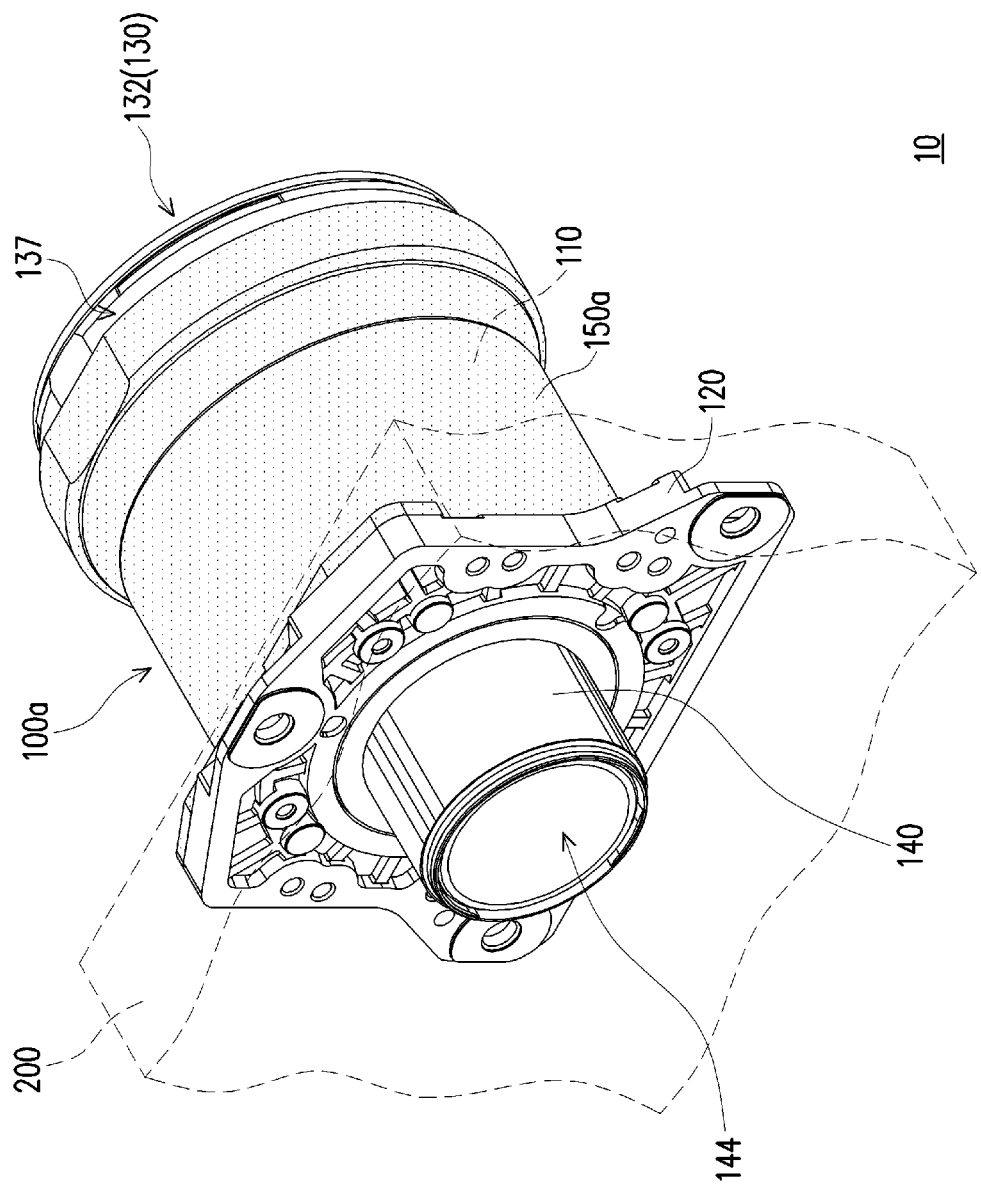
FIG. 1B is a three-dimensional diagram of the projection apparatus portion of FIG. 1A from another visual angle.
Figure 1C:
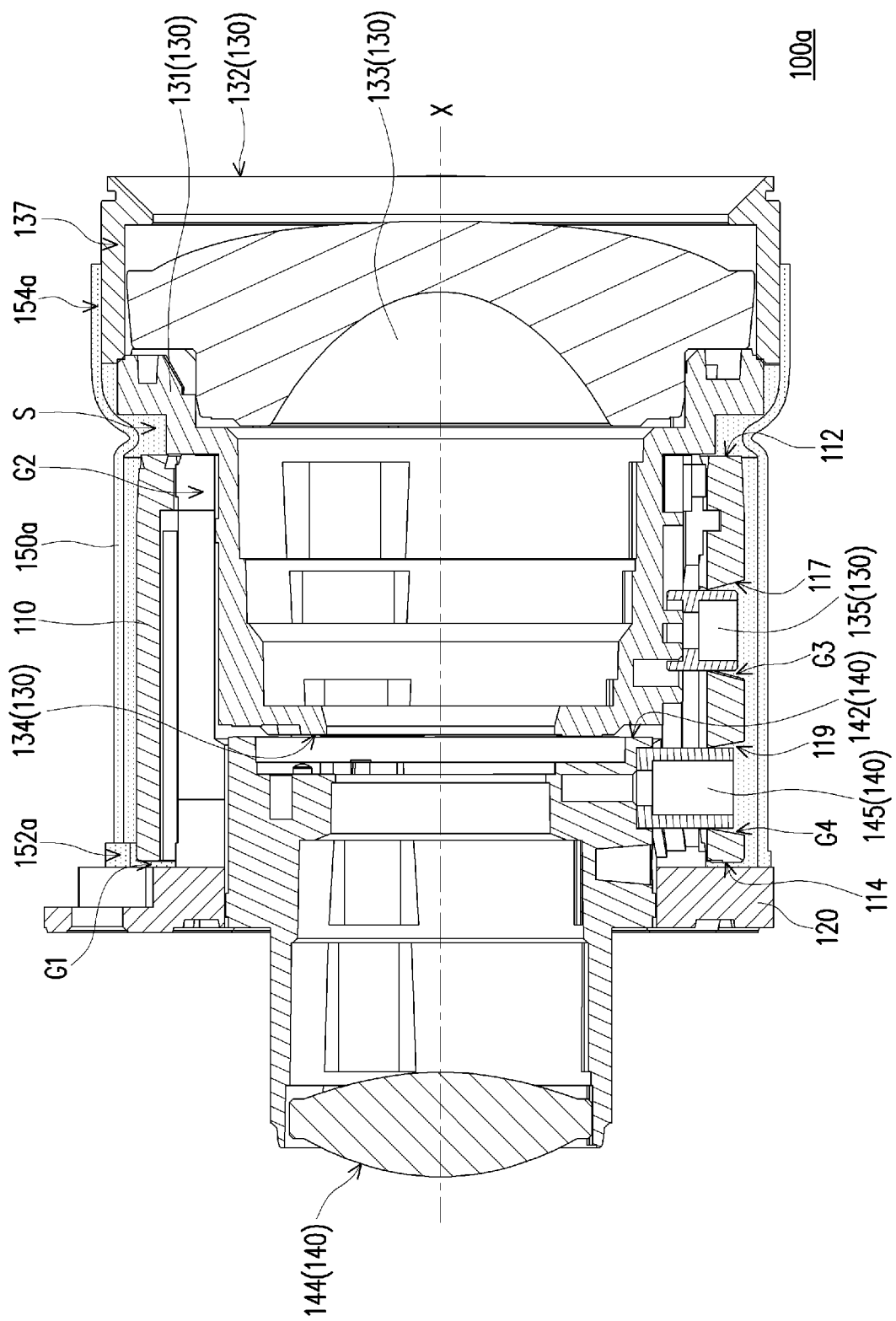
FIGS. 1C and 1D are respectively cross-sectional views showing that a first lens module and a second lens module of the lens structure of FIG. 1A are relatively close to each other and are relatively away from each other along an optical axis.
Figure 1D:
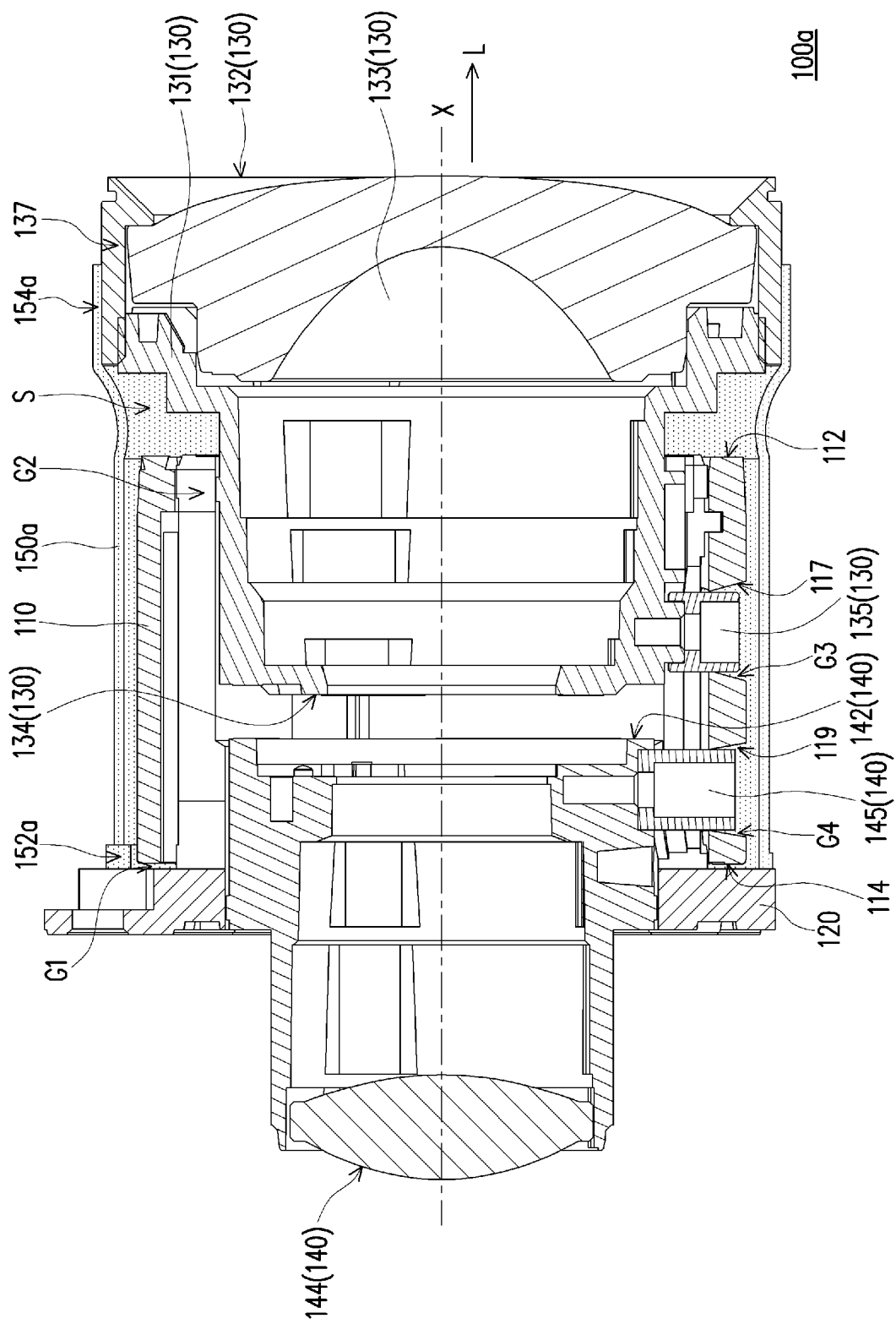

FIG. 1A is a three-dimensional diagram of a projection apparatus portion of one embodiment of the invention. FIG. 1B is a three-dimensional diagram of the projection apparatus portion of FIG. 1A from another visual angle. FIGS. 1C and 1D are respectively cross-sectional views showing that a first lens module and a second lens module of the lens structure of FIG. 1A are relatively close to each other and are relatively away from each other along an optical axis. Referring to FIGS. 1A, 1B and 1C together, in the embodiment, the projection apparatus 10 includes a lens structure 100a and an optical machine module 200. The lens structure 100a includes a lens barrel 110, a frame 120, a first lens module 130, a second lens module 140 and an elastic sleeve 150a. The lens barrel 110 includes a front end 112 and a rear end 114 opposite thereto. The front end 112 is specifically a light exiting end configured to project an image light beam (not shown) provided by the optical machine module 200. The rear end 114 is specifically a light incident end configured to receive the image light beam (not shown) provided by the optical machine module 200. The frame 120 leans against the rear end 114 of the lens barrel 110, and a first gap G1 is provided between the lens barrel 110 and the frame 120. The optical machine module 200 is assembled on the frame 120 of the lens structure 100a, and the frame 120 is located between the lens barrel 110 and the optical machine module 200. That is, the objective of designing the frame 120 is to fix the optical machine module 200.

The first lens module 130 includes a first side 132 and a second side 134 opposite thereto. The second side 134 is arranged in the front end 112 of the lens barrel 110, and the first side 132 is exposed outside the lens barrel 110. Here, a second gap G2 is provided between the lens barrel 110 and the first lens module 130, and the first lens module 130 may be regarded as a pre-group lens module. The second lens module 140 includes a third side 142 and a fourth side 144 opposite thereto. The third side 142 passes through the frame 120 and is arranged in the rear end 114 of the lens barrel 110, and the fourth side 144 is exposed outside the frame 120 and located in the optical machine module 200. Here, the second lens module 140 may be regarded as a post-group lens module. In addition, the first lens module 130 of the embodiment further includes a first blocking mechanism 135, and the second lens module 140 further includes a second blocking mechanism 145. The lens barrel 110 includes a first assembling opening 117 and a second assembling opening 119. The first blocking mechanism 135 is located in the first assembling opening 117, and a third gap G3 is provided between the first blocking mechanism 135 and the lens barrel 110. The second blocking mechanism 145 is located in the second assembling opening 119, and a fourth gap G4 is provided between the second blocking mechanism 145 and the lens barrel 110. In addition, the lens barrel 110 of the embodiment further includes a focusing mechanism 115 configured to adjust a focal length. The focusing mechanism 115 is, for example, a convex portion disposed on the lens barrel 110, but is not limited thereto. In the embodiment, the focusing mechanism 115 is used by a user to conveniently rotate the lens barrel 110. When the focusing mechanism 115 drives the lens barrel 110 to rotate around an optical axis X, the first assembling opening 117 and the second assembling opening 119 on the lens barrel 110 rotate with the lens barrel 110. The first assembling opening 117 and the second assembling opening 119 may be designed as spiral sliding rails around the optical axis X according to a demand. In this way, when the first assembling opening 117 and the second assembling opening 119 rotate, the first blocking mechanism 135 and the second blocking mechanism 145 may be respectively pushed by the first assembling opening 117 and the second assembling opening 119 which are embodied as the spiral sliding rails, and then the first lens module 130 and the second lens module 140 may be relatively close to and away from each other along the optical axis X. In other embodiments, the numbers of assembling openings, blocking mechanisms and focusing mechanisms are not limited, and may vary with the design of the lens structure. For example, in case of a relatively long lens structure, the lens structure may be designed with more assembling openings, blocking mechanisms and focusing mechanisms to achieve a focusing function.

Particularly, the elastic sleeve 150a of the embodiment includes a first end 152a and a second end 154a opposite thereto. The elastic sleeve 150a is sleeved on the lens barrel 110. The first end 152a of the elastic sleeve 150a extends and is connected to the frame 120 to completely cover the first gap G1. The first end 152a of the elastic sleeve 150a is, for example, fixed to the frame 120 in an attached way or other appropriate ways. The second end 154a of the elastic sleeve 150a extends onto a portion of the first lens module 130 to completely cover the second gap G2. Further, the elastic sleeve 150a may also completely cover the third gap G3 between the first blocking mechanism 135 and the lens barrel 110 and the fourth gap G4 between the second blocking mechanism 145 and the lens barrel 110. In addition, the elastic sleeve 150a of the embodiment further includes an opening 155. The focusing mechanism 115 passes through the opening 155 and is exposed outside the elastic sleeve 150a. In addition, the first lens module 130 includes a front edge 137 located on the first side 132 and surrounding the optical axis X. In the embodiment, the second end 154a of the elastic sleeve 150a may cover at least part of the front edge 137. In addition, the material of the elastic sleeve 150a includes silica gel or rubber. The elastic sleeve 150a may keep the shape and keep a certain distance from the lens barrel 110 due to the characteristic of the material of the elastic sleeve 150a, so as to avoid the influence on the adjustment hand feeling due to friction between the elastic sleeve 150a and the lens barrel 110 during adjustment of a focal length.

Based on the characteristic of the material of the aforementioned elastic sleeve 150a, the elastic sleeve 150a of the embodiment may generate an elastic deformation with the relative movement of the first lens module 130 and the second lens module 140 along the optical axis X. More specifically, referring to FIGS. 1C and 1D together, the first lens module 130 of the embodiment includes a first lens barrel 131 and a first lens group 133. The first lens group 133 is arranged in the first lens barrel 131, and a space S for allowing the elastic deformation of the elastic sleeve 150a is provided between the lens barrel 110 and the first lens barrel 131. As shown in FIG. 1C, when the first lens module 130 and the second lens module 140 are relatively close to each other along the optical axis X, the elastic sleeve 150a has a compression deformation in the space S. In another aspect, as shown in FIG. 1D, when the first lens module 130 and the second lens module 140 are relatively away from each other along the optical axis X, namely move towards a direction L, the elastic sleeve 150a has a tensile deformation in the space S. In short, the elastic sleeve 150a of the embodiment is embodied as a one-section type elastic sleeve, so that when the first lens module 130 and the second lens module 140 move relatively, the elastic sleeve 150a may generate the elastic deformation in the space S between the lens barrel 110 and the first lens barrel 131.

In a word, the elastic sleeve 150a of the embodiment at least may completely cover the first gap G1 between the lens barrel 110 and the frame 120 and the gap G2 between the lens barrel 110 and the first lens module 130, so that smog is unable to directly enter the optical machine module 200 via air convection. That is, by the design of the elastic sleeve 150a, the lens structure 100a may not be directly exposed in a flowing field of smog convection, which substantially reduces the possibility that the smog flows into the optical machine module 200, so that the projection apparatus 10 has relatively good brightness performance. Further, the elastic sleeve 150a of the embodiment is stable in elasticity of shape by die opening, and the smog prevention effect may be kept consistent. In addition, the elastic sleeve 150a has a lower price than that of Teflon, is easy to assemble, and can be repeatedly used, so that the cost can be effectively reduced.

It should be noted herein that the following embodiments follow the element reference numbers and partial content of the foregoing embodiments, where same reference numbers are used to represent the same or like elements and descriptions of same technical content is omitted. Descriptions of the omitted part may refer to the foregoing embodiments and are not described in the following embodiments again.

Figure 2A:
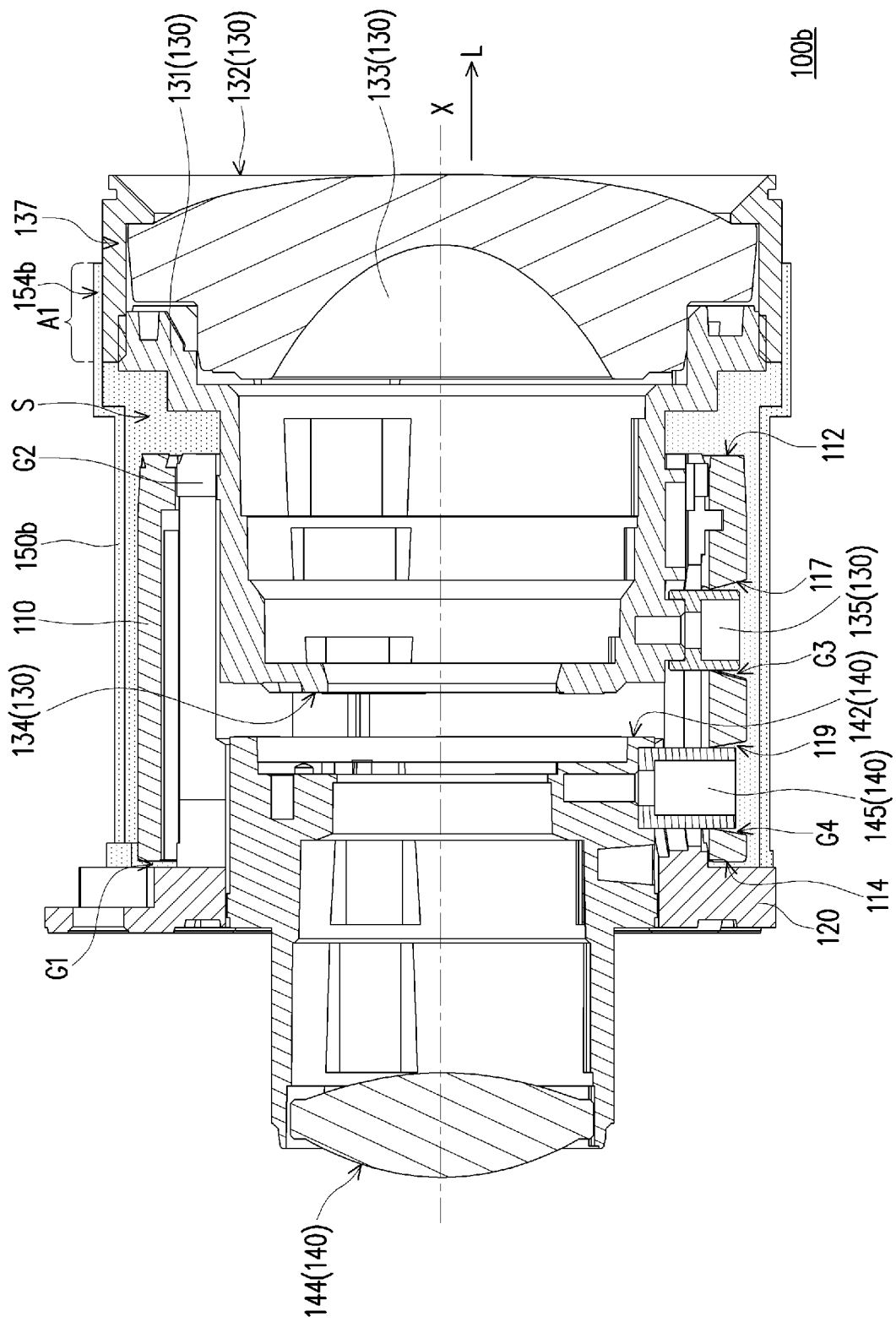
FIGS. 2A and 2B are respectively cross-sectional views showing that a first lens module and a second lens module of a lens structure of another embodiment of the invention are relatively close to each other and are relatively away from each other along an optical axis.
Figure 2B:
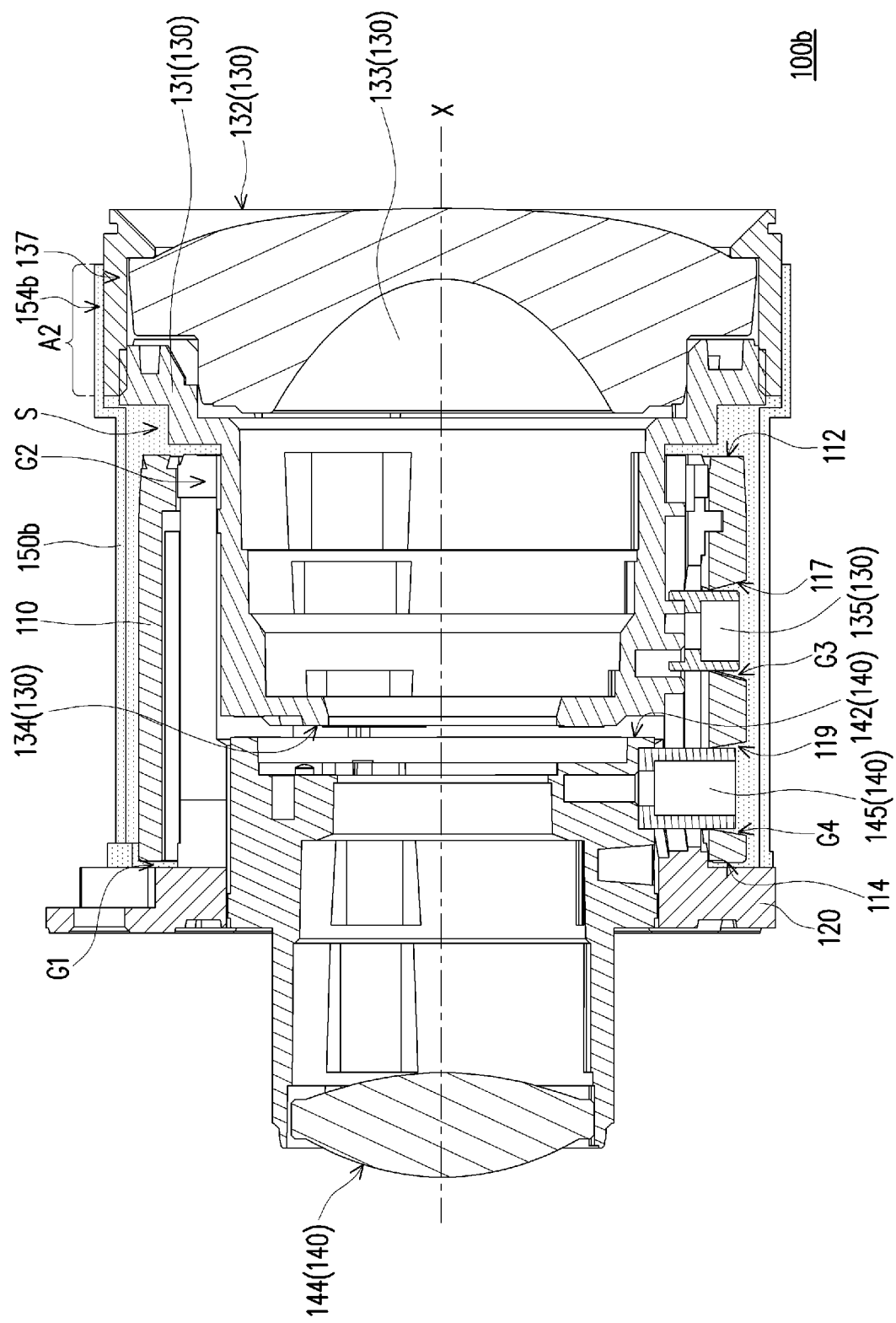

FIGS. 2A and 2B are respectively cross-sectional views showing that a first lens module and a second lens module of a lens structure of another embodiment of the invention are relatively close to each other and are relatively away from each other along an optical axis. Referring to FIGS. 1D and 2A together, a lens structure 100b of the embodiment is similar to the lens structure 100a of FIG. 2A, and a difference therebetween is that: when the first lens module 130 and the second lens module 140 of the embodiment move relatively, an elastic sleeve 150b does not generate the elastic deformation in the space S between the lens barrel 110 and the first lens barrel 131.

In detail, referring to FIGS. 2A and 2B together, when the first lens module 130 and the second lens module 140 are relatively away from each other along the optical axis X, a second end 154b of the elastic sleeve 150b covers a first region A1 of the front edge 137 of the first lens module 130, as shown in FIG. 2A. In another aspect, when the first lens module 130 and the second lens module 140 are relatively close to each other along the optical axis X, the second end 154b of the elastic sleeve 150b covers a second region A2 of the front edge 137 of the first lens module 130, as shown in FIG. 2B. Here, the first region A1 and the second region A2 partially overlap, and the area of the second region A2 is greater than that of the first region A1. That is, when the first lens module 130 and the second lens module 140 are relatively away from each other along the optical axis X, the elastic sleeve 150b may cover a little of the front edge 137 of the first lens module 130. When the first lens module 130 and the second lens module 140 are relatively close to each other along the optical axis X, the elastic sleeve 150*b* may cover much of the front edge 137 of the first lens module 130.

In short, the elastic sleeve 150*b* of the embodiment is specifically a one-section type elastic sleeve. The second end 154*b* of the elastic sleeve 150*b* and the front edge 137 of the first side 132 of the first lens module 130 generate low friction, which does not affect the relative movement of the first lens module 130 and the second lens module 140 along the optical axis X. Therefore, during the adjustment of the focal length, the friction between the elastic sleeve 150*b* and the lens barrel 110 may not affect the adjustment hand feeling, either.

Figure 3A:
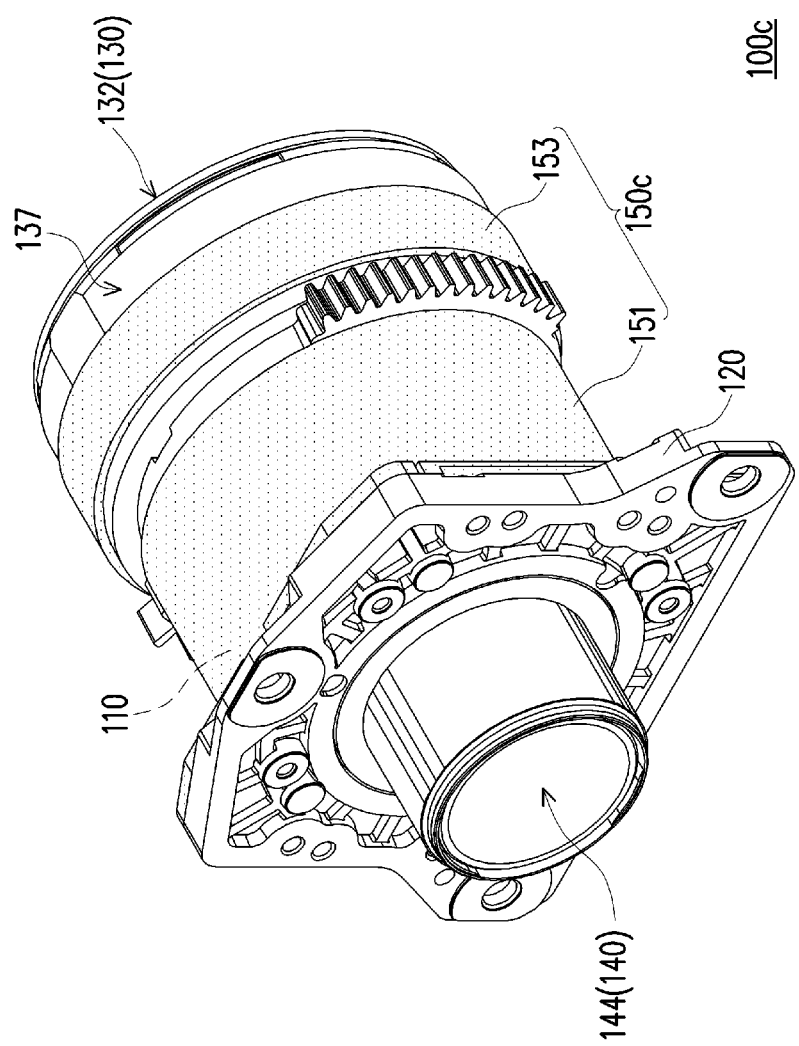
FIG. 3A is a three-dimensional diagram of a lens structure of another embodiment of the invention.
Figure 3B:
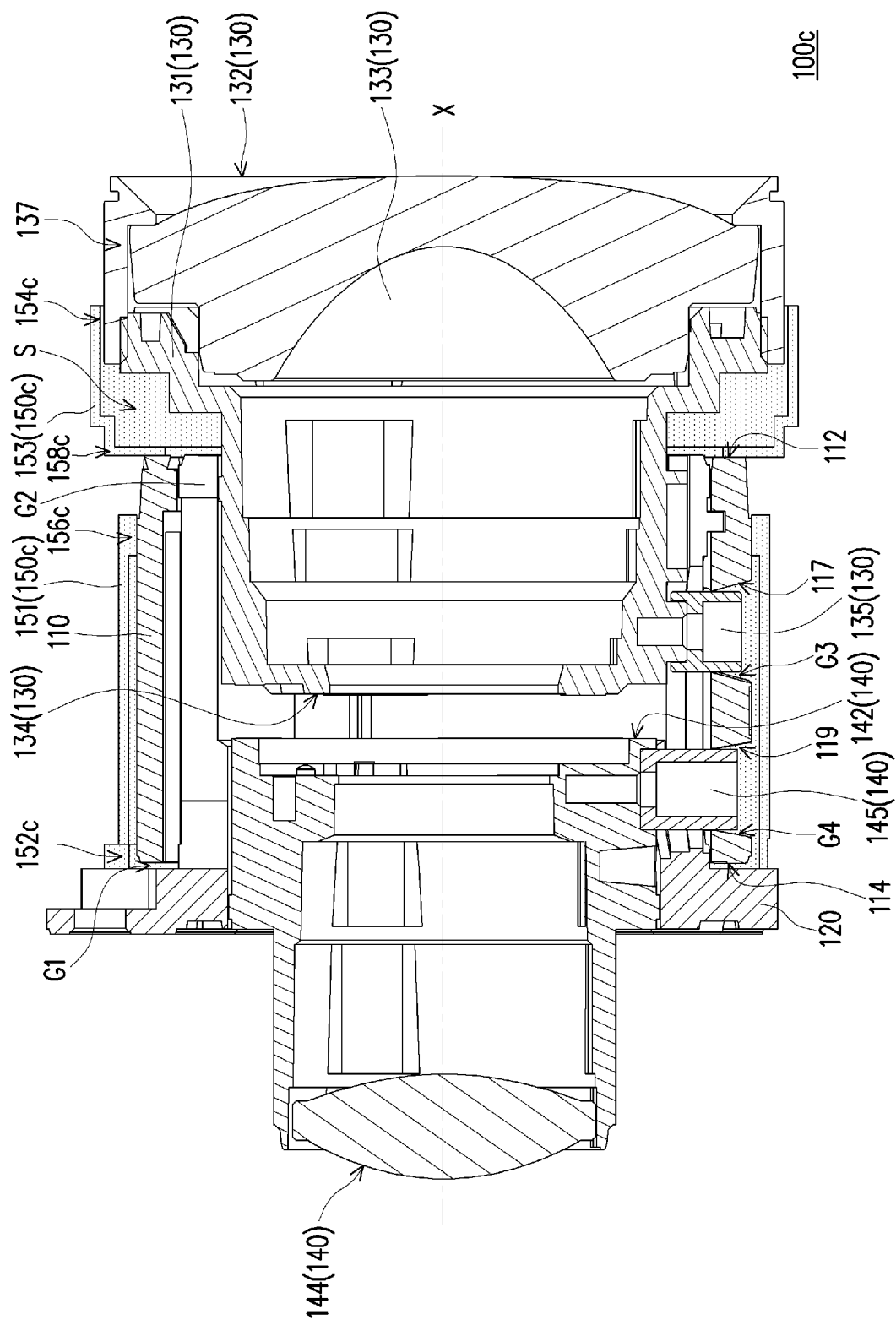
FIG. 3B is a cross-sectional view of the lens structure of FIG. 3A.

FIG. 3A is a three-dimensional diagram of a lens structure of another embodiment of the invention. FIG. 3B is a cross-sectional view of the lens structure of FIG. 3A. Referring to FIGS. 1B and 3A together, a lens structure 100*c* of the embodiment is similar to the lens structure 100*a* of FIG. 1C, and a difference therebetween is that: an elastic sleeve 150*c* of the embodiment is specifically a two-section type elastic sleeve. The elastic sleeve 150*c* includes a first elastic sleeve portion 151 and a second elastic sleeve portion 153.

In detail, referring to FIGS. 3A and 3B together, the first elastic sleeve portion 151 includes a first end 152*c* and a third end 156*c* opposite thereto. The third end 156*c* is sleeved on a portion of the lens barrel 110. The second elastic sleeve portion 153 is separated from the first elastic sleeve portion 151, and the second elastic sleeve portion 153 includes a second end 154*c* and a fourth end 158*c* opposite thereto. The fourth end 158*c* of the second elastic sleeve 153 extends between the lens barrel 110 and the first lens module 130. The second end 154*c* of the second elastic sleeve 153 and the front edge 137 of the first side 132 of the first lens module 130 generate low friction, which does not affect the relative movement of the first lens module 130 and the second lens module 140 along the optical axis X. Therefore, during the adjustment of the focal length, the friction between the elastic sleeve 150*c* and the lens barrel 110 may not affect the adjustment hand feeling, either. Since the elastic sleeve 150*c* is specifically the two-section type elastic sleeve, installation on the lens barrel 110 by a user is facilitated, and relatively high convenience in assembling is achieved.

Figure 4:
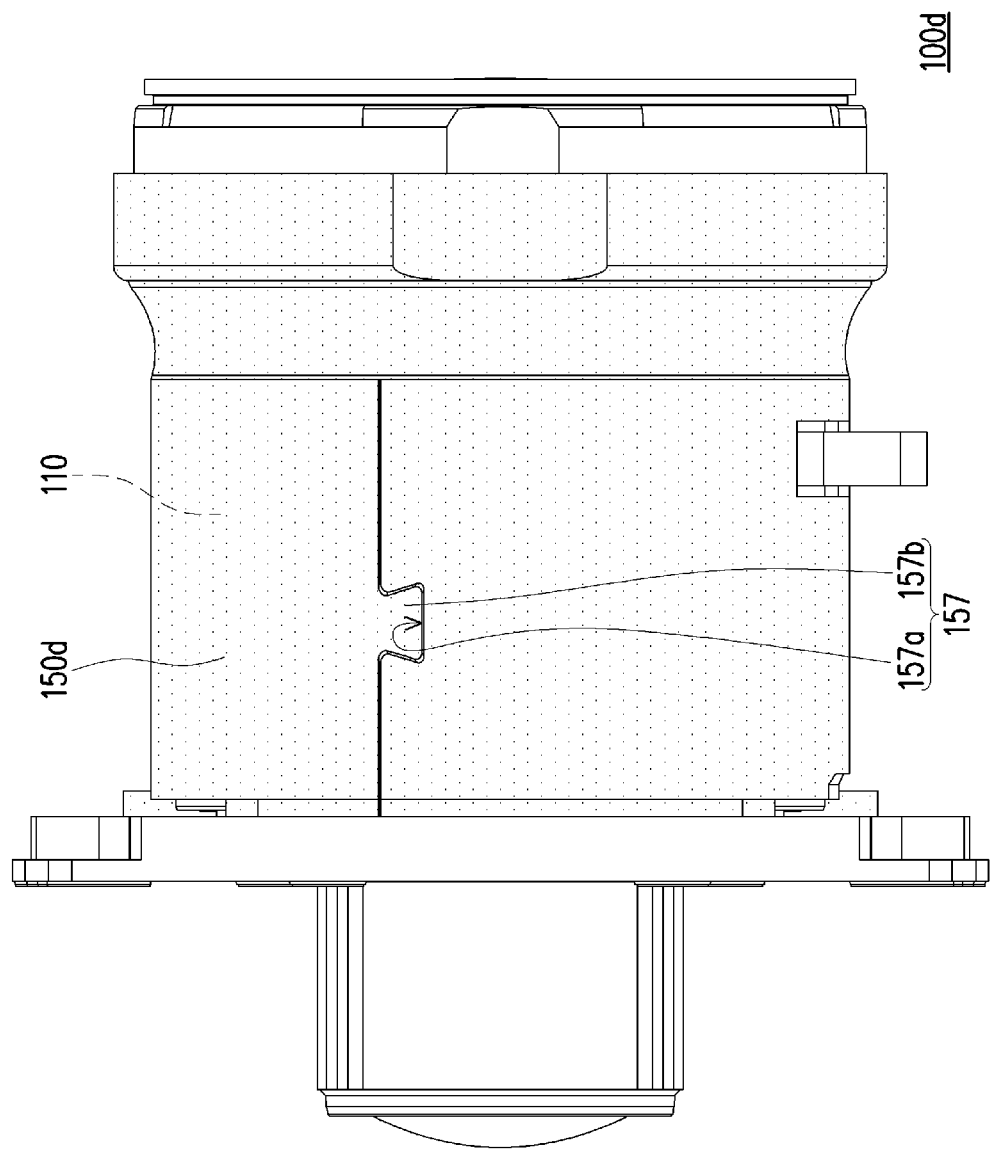
FIG. 4 is a side view of a lens structure of another embodiment of the invention.

FIG. 4 is a side view of a lens structure of another embodiment of the invention. Referring to FIGS. 1B and 4, a lens structure 100*d* of the embodiment is similar to the lens structure 100*a* of FIG. 1B, and a difference therebetween is that: an elastic sleeve 150*d* of the embodiment includes an incision 157, and the incision 157 forms a concave portion 157*a* and a convex portion 157*b*. The elastic sleeve 150*d* is arranged on the lens barrel 110 by the buckling of the concave portion 157*a* and the convex portion 157*b*. Since the elastic sleeve 150*d* of the embodiment is specifically a one-section type elastic sleeve and includes the incision 157, installation on the lens barrel 110 by a user is facilitated, and relatively high convenience in assembling is achieved.

Based on the above, the embodiments of the invention at least have one of the following advantages or effects. In the lens structure of the invention, the elastic sleeve is sleeved on the lens barrel, the first end of the elastic sleeve extends and is connected to the frame to completely cover the first gap between the lens barrel and the frame, and the second end of the elastic sleeve extends onto the portion of the first lens module to completely cover the second gap between the lens barrel and the first lens module. Thereby, the elastic sleeve can substantially reduce and even prevent smog from entering the lens structure from the first gap and the second gap via air convection. In addition, the projection apparatus adopting the lens structure of the invention can avoid the problem of great brightness reduction caused by the influence of the smog, and thus has relatively good brightness performance.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A lens structure, comprising a lens barrel, a frame, a first lens module, a second lens module, and an elastic sleeve, wherein the lens barrel has a front end and a rear end opposite thereto, the frame leans against the rear end of the lens barrel, wherein a first gap is provided between the lens barrel and the frame, the first lens module has a first side and a second side opposite thereto, the second side is disposed in the front end of the lens barrel, and the first side is exposed outside the lens barrel, wherein a second gap is provided between the lens barrel and the first lens module, the second lens module has a third side and a fourth side opposite thereto, the third side passes through the frame and is disposed in the rear end of the lens barrel, and the fourth side is exposed outside the frame, and the elastic sleeve has a first end and a second end opposite thereto, the elastic sleeve is sleeved on the lens barrel, the first end extends and is connected to the frame to completely cover the first gap, and the second end extends onto a portion of the first lens module to completely cover the second gap.

2. The lens structure according to claim 1, wherein the elastic sleeve generates elastic deformation with relative movement of the first lens module and the second lens module along an optical axis.

3. The lens structure according to claim 2, wherein the first lens module comprises a first lens barrel and a first lens group, the first lens group is disposed in the first lens barrel, and a space for allowing the elastic deformation of the elastic sleeve is provided between the lens barrel and the first lens barrel.

4. The lens structure according to claim 3, wherein the elastic sleeve generates tensile deformation in the space when the first lens module and the second lens module are relatively away from each other along the optical axis.

5. The lens structure according to claim 3, wherein, the elastic sleeve generates compression deformation in the space when the first lens module and the second lens module are relatively close to each other along the optical axis.

6. The lens structure according to claim 1, wherein the first lens module has a front edge located on the first side and surrounding an optical axis, the second end of the elastic sleeve covers a first region of the front edge of the first lens module when the first lens module and the second lens module are relatively away from each other along the optical axis, the second end of the elastic sleeve covers a second region of the front edge of the first lens module when the first lens module and the second lens module are relatively close to each other along the optical axis, the first region and the second region partially overlap, and an area of the second region is greater than an area of the first region.

7. The lens structure according to claim 1, wherein the elastic sleeve comprises a first elastic sleeve portion and a second elastic sleeve portion, wherein,
the first elastic sleeve portion has a first end and a third end opposite thereto, wherein the third end is sleeved on a portion of the lens barrel, and
the second elastic sleeve portion is separated from the first elastic sleeve portion and has a second end and a fourth end opposite thereto, and the fourth end extends between the lens barrel and the first lens module.

8. The lens structure according to claim 1, wherein the elastic sleeve has an incision, the incision comprises a concave portion and a convex portion, and the elastic sleeve is sleeved on the lens barrel through buckling of the concave portion and the convex portion.

9. The lens structure according to claim 1, wherein the lens barrel comprises a focusing mechanism, the elastic sleeve has an opening, and the focusing mechanism passes through the opening and is exposed outside the elastic sleeve.

10. The lens structure according to claim 1, wherein the first lens module comprises a first blocking mechanism, the second lens module comprises a second blocking mechanism, the lens barrel has a first assembling opening and a second assembling opening, the first blocking mechanism is located in the first assembling opening, a third gap is provided between the first blocking mechanism and the lens barrel, the second blocking mechanism is located in the second assembling opening, a fourth gap is provided between the second blocking mechanism and the lens barrel, and the elastic sleeve completely covers the third gap and the fourth gap.

11. A projection apparatus, comprising a lens structure and an optical machine module, wherein
the lens structure comprises a lens barrel, a frame, a first lens module, a second lens module, and an elastic sleeve, wherein,
the lens barrel has a front end and a rear end opposite thereto,
the frame leans against the rear end of the lens barrel, wherein a first gap is provided between the lens barrel and the frame,
the first lens module has a first side and a second side opposite thereto, the second side is disposed in the front end of the lens barrel, and the first side is exposed outside the lens barrel, wherein a second gap is provided between the lens barrel and the first lens module,
the second lens module has a third side and a fourth side opposite thereto, the third side passes through the frame and is disposed in the rear end of the lens barrel, and the fourth side is exposed outside the frame,
the elastic sleeve has a first end and a second end opposite thereto, the elastic sleeve is sleeved on the lens barrel, the first end extends and is connected to the frame to completely cover the first gap, and the second end extends onto a portion of the first lens module to completely cover the second gap, and
the optical machine module is assembled on the frame of the lens structure, wherein the frame is located between the lens barrel and the optical machine module, and the fourth side of the second lens module is located in the optical machine module.

12. The projection apparatus according to claim 11, wherein the elastic sleeve generates elastic deformation with relative movement of the first lens module and the second lens module along an optical axis.

13. The projection apparatus according to claim 12, wherein the first lens module comprises a first lens barrel and a first lens group, the first lens group is disposed in the first lens barrel, and a space for allowing the elastic deformation of the elastic sleeve is provided between the lens barrel and the first lens barrel.

14. The projection apparatus according to claim 13, wherein, the elastic sleeve generates tensile deformation in the space when the first lens module and the second lens module are relatively away from each other along the optical axis.

15. The projection apparatus according to claim 13, wherein, the elastic sleeve generates compression deformation in the space when the first lens module and the second lens module are relatively close to each other along the optical axis.

16. The projection apparatus according to claim 11, wherein, the second end of the elastic sleeve covers a first region of the first side of the first lens module when the first lens module and the second lens module are relatively away from each other along an optical axis, the second end of the elastic sleeve covers a second region of the first side of the first lens module when the first lens module and the second lens module are relatively close to each other along the optical axis, the first region and the second region partially overlap, and an area of the second region is greater than an area of the first region.

17. The projection apparatus according to claim 11, wherein the elastic sleeve comprises a first elastic sleeve portion and a second elastic sleeve portion, wherein, the first elastic sleeve portion has a first end and a third end opposite thereto, wherein the third end is sleeved on a portion of the lens barrel, and the second elastic sleeve portion is separated from the first elastic sleeve portion and has a second end and a fourth end opposite thereto, wherein the fourth end extends between the lens barrel and the first lens module.

18. The projection apparatus according to claim 11, wherein the elastic sleeve has an incision, the incision comprises a concave portion and a convex portion, and the elastic sleeve is sleeved on the lens barrel through buckling of the concave portion and the convex portion.

19. The projection apparatus according to claim 11, wherein the lens barrel comprises a focusing mechanism, the elastic sleeve has an opening, and the focusing mechanism passes through the opening and is exposed outside the elastic sleeve.

20. The projection apparatus according to claim 11, wherein the first lens module comprises a first blocking mechanism, the second lens module comprises a second blocking mechanism, the lens barrel has a first assembling opening and a second assembling opening, the first blocking mechanism is located in the first assembling opening, a third gap is provided between the first blocking mechanism and the lens barrel, the second blocking mechanism is located in the second assembling opening, a fourth gap is provided between the second blocking mechanism and the lens barrel, and the elastic sleeve completely covers the third gap and the fourth gap.

\* \* \* \* \*